(12) United States Patent  
Milligan et al.

(10) Patent No.: US 6,546,458 B2  
(45) Date of Patent: Apr. 8, 2003

(54) METHOD AND APPARATUS FOR ARBITRARILY LARGE CAPACITY REMOVABLE MEDIA

(75) Inventors: Charles A. Milligan, Golden, CO (US); James P. Hughes, Lino Lakes, MN (US); Jacques Debiez, Cugnaux (FR)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/751,572

(22) Filed: Dec. 29, 2000

(65) Prior Publication Data

US 2002/0087785 A1 Jul. 4, 2002

(51) Int. Cl.[7] .............................................. G06F 12/00
(52) U.S. Cl. ...................................... 711/114; 711/115
(58) Field of Search ........................ 711/111, 114, 115; 707/204

(56) References Cited

U.S. PATENT DOCUMENTS 6,393,516 B2 * 5/2002 Johnson ..................... 711/111

2002/0004883 A1 * 1/2002 Nguyen ..................... 711/111

* cited by examiner

Primary Examiner—Jack A. Lane  
(74) Attorney, Agent, or Firm—Carstens, Yee & Cahoon, L.L.P.

(57) ABSTRACT

A method and apparatus to handle multiple sets of removable media within a storage system. A first set of removable media are mounted on a set of drives. Data is accepted until the first set of removable media is filled. A second set of removable media is mounted on the drives, while the first set of removable media is removed. When the change in removable media is complete, writing of data proceeds on the second set of removable media. Data may be buffered while the change in removable media occurs. Alternatively, two sets of removable media may be mounted at the same time. When the first set of removable media is filled to a selected amount, the second set of removable media may then be used to write the data. A third set of removable media is set up or mounted for use, while the first set of removable media is removed.

23 Claims, 14 Drawing Sheets

| Storage Device | | | | | | | | | | | |
|---|---|---|---|---|---|---|---|---|---|---|---|
| STORAGE DEVICE | 0 | P2 | P1 | P0 | 7 | 6 | 4 | 3 | 2 | 1 | 0 | P1 |
| STORAGE DEVICE | 1 | 0 | P2 | P1 | P0 | 7 | 5 | 4 | 3 | 2 | 1 | 0 |
| STORAGE DEVICE | 2 | 1 | 0 | P2 | P1 | P0 | 6 | 5 | 4 | 3 | 2 | 1 |
| STORAGE DEVICE | 3 | 2 | 1 | 0 | P2 | P1 | 7 | 6 | 5 | 4 | 3 | 2 |
| STORAGE DEVICE | 4 | 3 | 2 | 1 | 0 | P2 | P0 | 7 | 6 | 5 | 4 | 3 |
| STORAGE DEVICE | 5 | 4 | 3 | 2 | 1 | 0 | P1 | P0 | 7 | 6 | 5 | 4 |
| STORAGE DEVICE | 6 | 5 | 4 | 3 | 2 | 1 | 0 | P1 | P0 | 7 | 6 | 5 |
| STORAGE DEVICE (401) | 7 | 6 | 5 | 4 | 3 | 2 | ▨ | ▨ | ▨ | ▨ | ▨ | ▨ |
| STORAGE DEVICE (402) | P0 | 7 | 6 | 5 | 4 | 3 | 1 | 0 | P1 | P0 | 7 | 6 |
| STORAGE DEVICE | P1 | P0 | 7 | 6 | 5 | 4 | 2 | 1 | 0 | P1 | P0 | 7 |
| STORAGE DEVICE | P2 | P1 | P0 | 7 | 6 | 5 | 3 | 2 | 1 | 0 | P1 | P0 |

*FIG. 4A*

| Storage Device | | | | | | | | | | | |
|---|---|---|---|---|---|---|---|---|---|---|---|
| STORAGE DEVICE | 0 | P2 | P1 | P0 | 7 | 6 | 3 | 2 | 1 | 0 | P2 | P1 |
| STORAGE DEVICE | 1 | 0 | P2 | P1 | P0 | 7 | 4 | 3 | 2 | 1 | 0 | P2 |
| STORAGE DEVICE | 2 | 1 | 0 | P2 | P1 | P0 | 5 | 4 | 3 | 2 | 1 | 0 |
| STORAGE DEVICE | 3 | 2 | 1 | 0 | P2 | P1 | 6 | 5 | 4 | 3 | 2 | 1 |
| STORAGE DEVICE | 4 | 3 | 2 | 1 | 0 | P2 | P0 | 6 | 5 | 4 | 3 | 2 |
| STORAGE DEVICE | 5 | 4 | 3 | 2 | 1 | 0 | P1 | P0 | 6 | 5 | 4 | 3 |
| STORAGE DEVICE | 6 | 5 | 4 | 3 | 2 | 1 | P2 | P1 | P0 | 6 | 5 | 4 |
| STORAGE DEVICE | 7 | 6 | 5 | 4 | 3 | 2 | ✗ | ✗ | ✗ | ✗ | ✗ | ✗ |
| STORAGE DEVICE | P0 | 7 | 6 | 5 | 4 | 3 | 0 | P2 | P1 | P0 | 6 | 5 |
| STORAGE DEVICE | P1 | P0 | 7 | 6 | 5 | 4 | 1 | 0 | P2 | P1 | P0 | 6 |
| STORAGE DEVICE | P2 | P1 | P0 | 7 | 6 | 5 | 2 | 1 | 0 | P2 | P1 | P0 |

METADATA INTRODUCED
    COLLECTION OF METADATA - STRATEGICALLY LOCATED ON EACH UNIT OF MEDIA
        CURRENT EXISTENCE OF OTHER SETS OF MEDIA
            IDENTIFICATION OF MEDIA UNITS USED
            IDENTIFICATION OF TECHNOLOGY USED
        FURTHER EXTENSIONS ALLOWED? (YES/NO)
        ALGORITHMS FOR MAPPING OF CUSTOMER DATA ACROSS SETS
        LOCATION IN OTHER SETS OF DELIMITER INFORMATION (E.G., TAPE MARKS)
        BOUNDARIES FOR USE OF MEDIA SETS
            LIMITATIONS ON NUMBERS AND SEQUENCING
            LIMITATIONS ON TECHNOLOGIES EMPLOYED
    COLLECTION OF METADATA FOR EACH SUPER BLOCK
        OTHER SUPERBLOCKS IN THIS GROUP
        LOCATION OF OTHER SUPERBLOCKS IN THIS GROUP (INCLUDES MEDIA IN A DIFFERENT SET WHEN STAGING)

METHOD AND APPARATUS FOR ARBITRARILY LARGE CAPACITY REMOVABLE MEDIA

CROSS REFERENCE TO RELATED APPLICATIONS

The present invention is related to an application entitled Apparatus and Method for Writing and Reading Data to and From a Virtual Volume of Redundant Storage Devices, Ser. No. 09/638,205, filed Aug. 11, 2000, assigned to the same assignee, and incorporated herein by reference.

FIELD OF THE INVENTION

The present invention is directed to an apparatus and method for writing and reading data to and from a virtual volume of redundant storage devices. In particular, the present invention is directed to an apparatus and method in which metadata is stored for every block in a superblock written to a plurality of physical storage devices, such that a data volume may be easily rebuilt from any arbitrary subset of the redundant storage devices.

BACKGROUND OF THE INVENTION

To improve the performance of removable media, such as magnetic tapes and magnetic disks, the most efficient and known method is to build a Redundant Array of Independent Removable (RAIR) storage devices. Such arrays can provide increased throughput by striping data over multiple media located in multiple redundant storage devices. Additionally, these arrays of redundant storage devices can provide increased reliability by adding a parity mechanism used to correct for errors in reading/writing data to the media.

Redundant Array of Independent Tape (RAIT) systems are the tape implementation of a RAIR storage system. RAIT systems use a plurality of tape drives to improve the performance and reliability of the storage medium. Data may be striped across many tape drives to increase performance. However, the drawback is that any tape error renders the complete stripe group unreadable. Thus, when a storage device in the array of redundant storage devices fails, the data being written to or read from the failed storage device must be reconstructed.

A method for reconstructing missing data using cross-parity stripes on a storage medium, such as magnetic tape media, is described in commonly assigned and co-pending U.S. patent application Ser. No. 09/490,258 entitled "Apparatus and Method for Reconstructing Missing Data Using Cross-Parity Stripes on Storage Media" filed Jan. 24, 2000, which is hereby incorporated by reference. The apparatus and method described in U.S. patent application Ser. No. 09/490,258 makes use of a plurality of parity stripes for reconstructing missing data stripes. The parity symbol values in the parity stripes are used as a basis for determining the value of the missing data symbol in a data stripe. A correction matrix is shifted along the data stripes, correcting missing data symbols as it is shifted. The correction is performed from the outer most data stripes towards the inner data stripes to thereby use previously reconstructed data symbols to reconstruct other missing data symbols.

The data is reconstructed by organizing the received parity stripes in order. The smallest slope diagonal lines of the correction matrix, representing the linear equations of the parity symbols, may be used to correct the top and bottom most missing data stripes as deep as is necessary. Once the top and bottom most data stripes are corrected, the next largest slope lines may be used to correct the next inner missing data stripe and so forth until all the missing data stripes are corrected.

The use of parity stripes and parity symbols to reconstruct missing data, while beneficial, may greatly reduce the throughput of the overall RAIR system. Thus, it would be beneficial to have an apparatus and method that compensates for failures in storage devices without compromising the throughput of the overall RAIR system. In addition, it would be desirable to be able detect and reconstruct the failures in the system offline to the actual processing of the data in behalf of a using application.

SUMMARY OF THE INVENTION

The present invention provides apparatus and method for writing and reading data to and from a virtual volume of redundant storage devices. The apparatus and method make use of metadata identifying the number of data storage devices and number of redundancy storage devices in the virtual volume of redundant storage devices. In addition, other metadata, such as the identity of the data storage devices and parity storage devices may be utilized. The metadata is stored with each block written to each of the storage devices. In the event of a failure of a storage device, the metadata is modified to reflect the failure and the storage device to which the data intended for the failed storage device was written. In this way, if a failure of a storage device is encountered, each block in the virtual volume of redundant storage devices has enough information in the metadata to identify where to find the data that was intended for the failed storage device. Thus, reconstruction of data using redundancy information is not required.

The present invention includes an additional feature to handle multiple sets of removable media within a storage system. A first set of removable media is mounted on a set of drives. Data is accepted until the first set of removable media is filled. A second set of removable media is mounted on the drives, while the first set of removable media is removed. When the change in removable media is complete, writing of data proceeds on the second set of removable media. Data may be buffered while the change in removable media occurs. Alternatively, two sets of removable media may be mounted at the same time. When the first set of removable media is filled to a selected amount, the second set of removable media may then be used to write the data. A third set of removable media is set up or mounted for use, while the first set of removable media is removed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is an exemplary diagram illustrating an operation of one embodiment of the present invention when a storage device in the array of storage devices fails;

FIG. 4B is an exemplary diagram illustrating an operation of an alternative embodiment of the present invention when a storage device in the array of storage devices fails;

FIG. 6 is an exemplary diagram of additional information that may be included in the superblock header;

FIG. 13 is a table depicting the various types of metadata employed by this invention in order to allow the using systems to configure or re-configure arbitrarily large capacity removable media virtual volumes or virtual files or virtual linear address spaces.

DETAILED DESCRIPTION OF THE PREFERRED EMBODIMENT

Figure 1:
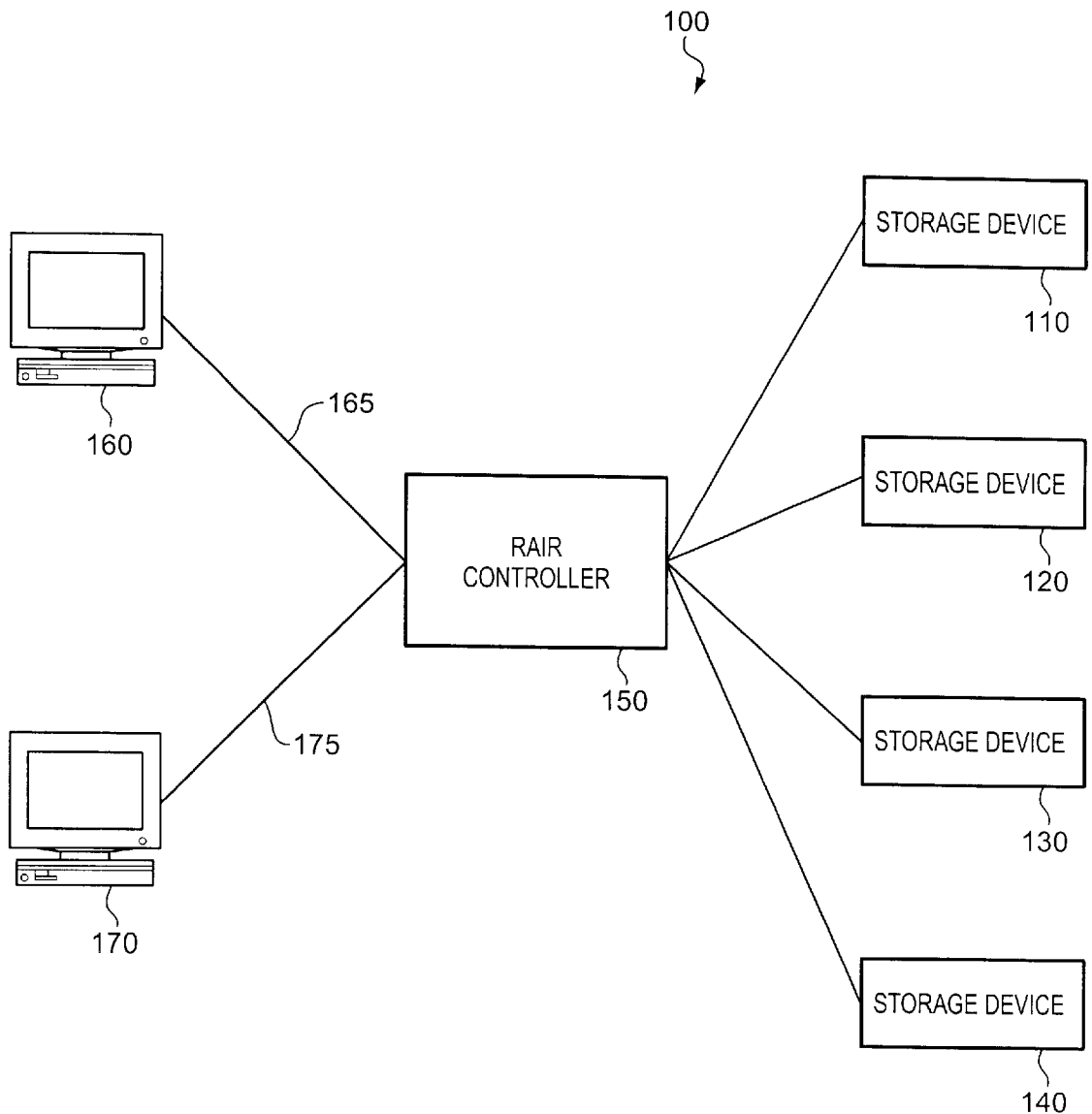
FIG. 1 is an exemplary block diagram of a data processing system according to the present invention.

FIG. 1 is an exemplary block diagram of a Redundant Array of Independent Removable (RAIR) storage system 100 according to the present invention. As shown in FIG. 1, the RAIR system 100 includes a plurality of redundant storage devices 110–140, a RAIR controller 150, and a plurality of user devices 160 and 170.

The RAIR controller 150 controls the reading and writing of data across the plurality of redundant storage devices 110–140. The RAIR controller 150 performs the functions described herein with regard to determining superblock headers, sending superblock header information, data and parity information to the redundant storage devices 110–140 to be written to the storage media, modifying superblock headers, and the like. The RAIR controller 150 includes a processor 151, and input device 152, an output device 153, and a main memory 154. The processor 151 operates under the guidance of programs stored in main memory 154. The processor 151 performs the functions described herein, to data and parity information input via the input device 152 and output via the output device 153.

The user devices 160 and 170 may be any type of data processing system capable of sending and receiving data from the plurality of redundant storage devices 110–140 via the RAIR controller 150. For example, the user devices 160 and 170 may be mainframe computers, personal computers, network computers, workstations, personal digital assistants, and the like.

The user devices 160 and 170 send and receive data to the RAIR controller 150 via the communication links 165 and 175. The communication links 165 and 175 may be any type of data transfer communication links. For example, the communication links 165 and 175 may be parallel or serial cables, co-axial cables, fiber optic cables, wireless communication links, and the like. The communication links 165 and 175 may further be part of a network such as a local area network, wide area network, intranet, the Internet, satellite communication network, and the like.

The redundant storage devices 110–140 may be any type of storage device that reads/writes data to a storage medium. The storage medium may be, for example, magnetic tape, magnetic disk, optical disk, CD-ROM, rewriteable CD-ROM, DVD, Magneto-optical medium, magnetic disk or tape cartridge, or the like. The storage medium used in the redundant storage devices 110–140, in the depicted example, is removable, although the invention is not limited to such an embodiment. Rather, the invention may be applied to any redundant storage system in which data is written to storage medium across a plurality of redundant storage devices.

The storage medium, in a preferred embodiment, is removable and replaceable via, for example, automation such as robotic arm assemblies (not shown), which may retrieve and replace storage medium from a library of storage medium and insert the storage medium into a respective redundant storage device 110–140. Thereafter, data may be written to or read from the storage medium under the control of RAIR controller 150.

It should be noted that the redundancy technique used as an example in the exemplary embodiments herein is specifically angular parity, but various other redundancy mechanisms can be employed and also a mixture of redundancy mechanisms could be employed without departing from the spirit and scope of the present invention. Wherever parity is used in the following exemplary embodiments, Reed Solomon redundancy calculations could be employed or any other mechanism that uses a set of discrete elements to develop a redundancy block for later reconstruction of a lost piece of data.

The following description of the preferred embodiments of the invention will reference the storage device and the storage medium interchangeably. For purposes of this description, when the term storage device is utilized, what is meant is the storage device having a removable storage medium loaded therein. Thus, if data is written to a storage device, what is meant is that the data is sent to the storage device, which writes the data to the loaded storage medium.

To the user devices 160 and 170, the plurality of redundant storage devices 110–140 are seen as a single virtual volume to which data is written and from which data is read. Thus, even though there are numerous physical storage devices employed, the user devices 160 and 170 access the physical storage devices, as if they were a single, very fast, large, and reliable storage device.

The virtual volume is a group of n+p physical volumes, i.e. physical storage devices, where n is the data stripping width and p is the number of parity stripes. The examples of the present invention will assume a data stripping width of 8, i.e. the number of data tracks, and the number of parity stripes to be 3, i.e. the number of parity tracks used for error correction. Thus, the following examples will assume n=8 and p=3, although the present invention is applicable to any relevant number of parity stripes and any data stripping width.

Figure 2:
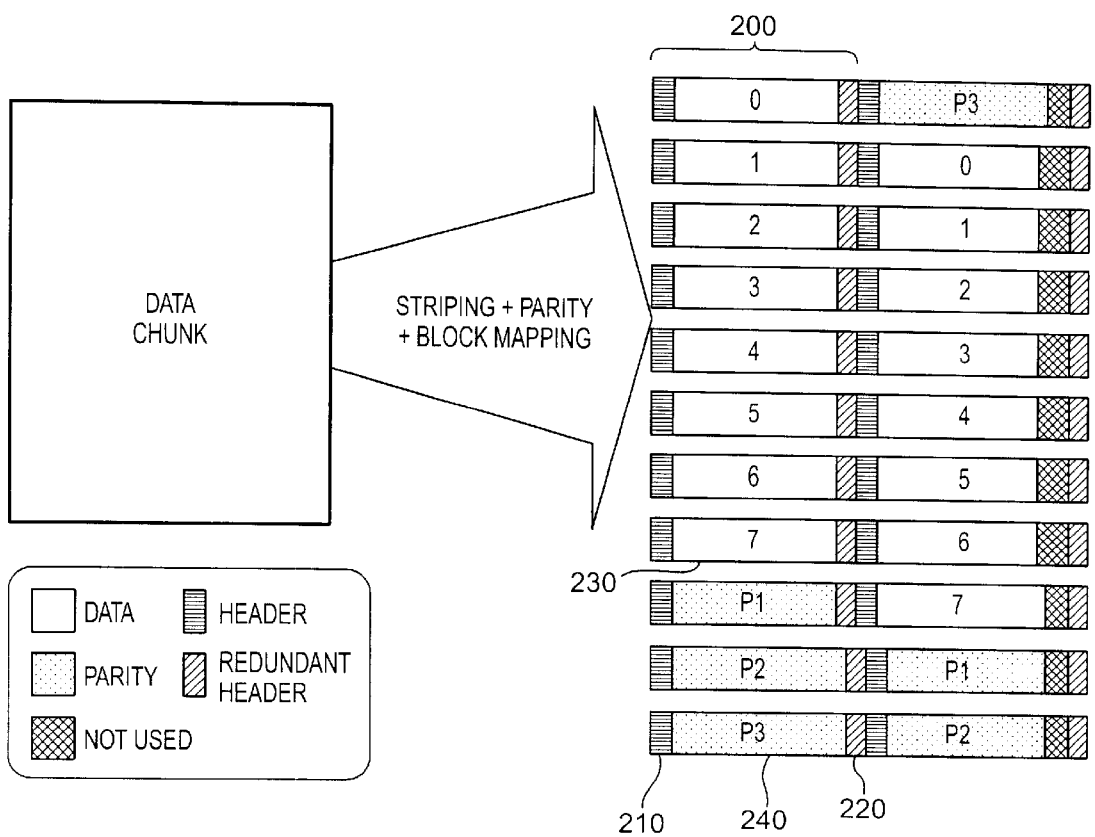
FIG. 2 is an exemplary diagram illustrating the manner in which a data chunk is striped with data and parity information and mapped to superblocks which are then striped across a plurality of storage devices in a virtual volume.

FIG. 2 is an exemplary diagram illustrating the manner in which a data chunk is striped with data and parity information and mapped to superblocks which are then striped across a plurality of storage devices in a virtual volume, such as storage devices 110–140. As shown in FIG. 2, each chunk of data is broken up and mapped into superblocks for storage on the plurality of storage devices. The mapping of data into superblocks is generally known in the art and thus, a detailed description of this process is not provided here. An example of using superblocks can be found in the StorageTek subsystems employing 36 track tape devices.

In order to avoid the too often employment of gaps between small records, the records written to the RAIR subsystem from the host system are concatenated and written as one large superblock. A superblock is a set of n+p physical blocks. Each physical block is written to one of the storage devices in the array of storage devices. Thus, for example, the physical blocks 0–7 and P0–P3 represent a single superblock 200. The physical block length can be fixed or variable. For purposes of the present description, it is assumed that the physical block lengths are fixed.

With the present invention, each block in the superblock 200 starts or ends with a 'header' 210. The header can be optionally repeated, as a redundant header 220, at the end of each physical block for checking and redundancy purposes. For any of the physical blocks inside the superblock 200, the header 210 is identical from one block to the next, with the exception of the occurrence of a failure as will be discussed in detail hereafter.

Between the header 210 of the block and the redundant header 220, or header 210 of the next block, is the data 230 or parity information 240 that is to be written to the storage device. Because the amount of data or parity information that is written to the storage device may vary, in order to maintain a fixed physical block length, there may be unused portions 250 of the physical block. This is offset by allowing the subsystem to span the records, written by the using host system to the subsystem, across superblock boundaries. Thus, the records, as seen from the host point of view, can be arbitrarily large compared to the superblock size.

The header 210 may include sufficient information for reconstructing the superblock 200 should an error occur in the writing or reading of information to or from the plurality of storage devices. The header 210 may include any information that may be utilized for determining the superblock 200. However, as minimum header information, the header 210 may include the following information in the following format:

$$\{vv, n, p, k, pvidd_0 \ldots pvidd_{n-1}, pvidp_0 \ldots pvidp_{p-1}\}$$

where:

| | |
|---|---|
| vv | is the virtual volume identification; |
| n | is the number of data stripes; |
| p | is the number of parity stripes; |
| k | is the present superblock sequence number; |
| $pvidd_i$ | is the physical volume identifier for a data stripe I, I=0...n-1; and |
| $pvidp_j$ | is the physical volume identifier for a parity stripe j, j=0...p-1. |

The header 210 shown above represents a minimum amount of information that may be stored in the header according to the present invention. Additional information may be included in the header to make the header more versatile, as will be described hereafter.

From the header 210 information, the RAIR system can determine the virtual volume to which the data is written (vv), the number of data stripes that are written (n), the number of parity stripes that are written (p), the position of this superblock in a sequence of superblocks being written to or read from the storage device (k), and the particular storage devices on which the data and parity information are stored ($pvidd_i$ and $pvidp_j$). The virtual volume may be used to determine which physical storage devices to be included in the array of storage devices to which data is written to or read from. The number of data stripes and parity stripes provides the system with an indication of what to expect when writing to or reading from the array of storage devices. The superblock sequence number provides an indication of which superblocks preceded the current superblocks and which superblocks are to follow the current superblock. This information may be used should an error occur in the reading or writing of the superblock.

The data and parity information storage device identifiers may be used as an indication from which set of storage devices data and parity information is to be written or read from. The set of storage devices used can be changed for each superblock thus allowing for dynamic mapping of the superblocks across different sets of storage devices.

Thus, for example, in the superblock 200 of FIG. 2, the header 210 may take the form of:

$$\{1, 8, 3, 101, 0\text{–}7, 8\text{–}10\}$$

The header 210 shown above represents a virtual volume identified as virtual volume 1. The virtual volume 1 has 8 data stripes, i.e. 8 data storage devices, and 3 parity stripes, i.e. 3 parity storage devices. The superblock 200 is number 101 in a sequence of superblocks, i.e. the superblock 200 is between superblocks 100 and 102 in the sequence. The storage devices that store data corresponding to the superblock 200 are storage devices 0–7. The storage devices that store parity information corresponding to the superblock 200 are storage devices 8–10. As is apparent to those of ordinary skill in the art, the header described above, when implemented by a computer system, will be in a data format such as binary, hexadecimal, or the like.

Figure 3:
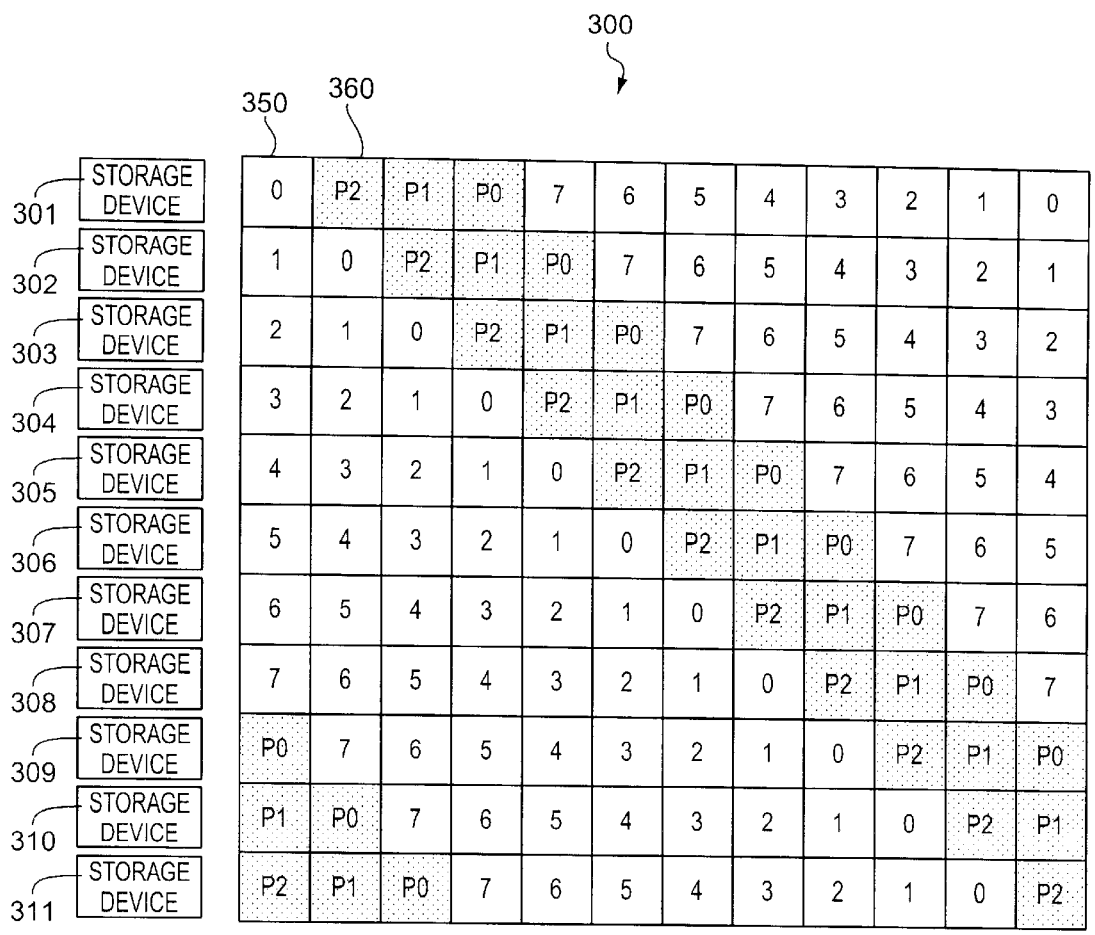
FIG. 3 is an exemplary diagram illustrating a write rotation with regard to an array of storage devices in a virtual volume.

With the present invention, a data chunk is written to and read from a plurality of storage devices, such as the plurality of redundant storage devices 110–140, in a rotating manner such as shown in FIG. 3. As shown in FIG. 3, the array of redundant storage devices 300, in this example, includes 8 data storage devices and 3 parity storage devices, for a total of 11 storage device (n=8, p=3, n+p=11). Each row of the storage device array 300 shown in FIG. 3 represents a single physical storage devices 301–311. All of the rows, and hence all of the physical storage devices, constitute a virtual volume. The non-shaded blocks numbered 0–7 in FIG. 3 represent data storage devices to which data is written or from which data is read. The shaded blocks number P0–P2 represent parity storage devices to which parity information is read. For purposes of the following description, only a write operation to the array of storage devices 300 will be described in detail. However, as will be apparent to those of ordinary skill in the art, the principles of the invention are also application to a read operation.

As shown, the data and parity information are written to the array of storage devices 300 in a rotating manner. Thus, for example, a data stripe 0 value is written to the first storage device 301 during a first write event. During the next write event, parity information P2 is written to the first storage device 301 while a data stripe 0 value is written to the second storage device 302.

The parity information will not be as easily compressed as the data since the parity generation process randomizes the parity information. Therefore when compression is turned on at the drive level, an algorithmic method of distributing the writing of data and parity information, e.g., rotation, among the storage devices helps assure that the storage capacity of all of the storage devices 301–311 is reached at approximately the same time.

For example, if a specific set of storage devices were always used to store the parity information while other storage devices were always used to store the data, the storage capacity of the parity storage device would be reached much earlier than the data storage devices. Therefore, in order to assure approximately the same amount of storage space on each storage device 301–311 for any given time, the data and parity information are written to the storage devices 301–311 in an algorithmically determined manner. For the description of the preferred embodiment, it will be assumed that a rotating algorithmic mechanism is utilized.

The parity information is used when, for example, data is corrupted and must be reconstructed. As is well known in the art, the parity information provides information from which, along with other uncorrupted data, the corrupted data may be reconstructed. A method of using parity information for reconstructing corrupted data is described in the incorporated U.S. patent application Ser. No. 09/490,258. Other parity methods may be utilized without departing from the spirit and scope of the present invention.

As information is written to the array of physical storage devices 300, header information, such as header 210, indicating the number of data stripes and parity stripes as well as which storage devices store the data stripes and parity stripes is written to the storage devices for each block of information. Thus, for example, the header of the first superblock 350 may have the format {1, 8, 3, 101, 0–7, 8–10}. The header for the second superblock 360 may have the format {1, 8, 3, 102, 1–8, 0 and 9–10} indicating that the superblock 360, relative to superblock 350, is in the same volume, has the same number of data and parity stripes, is the next superblock in a sequence of superblocks, and has different physical devices storing the data and parity information.

The headers for the superblocks will change based on the virtual volume, number of data and parity stripes, superblock sequence number, and physical devices storing the data and parity information, as the superblocks are written to the virtual volume. However, each superblock header may be used to identify the superblock and the location of data and parity information for the superblock virtually independent of the other superblocks.

During writing or reading of information from a virtual volume, one or more of the physical storage devices in the array of storage devices may fail due to any number of reasons. The failure of a storage device may be determined, for example, based on an interrogation of the storage device prior to writing a superblock to the array of storage devices or may be determined based on the failure of a write attempt to the storage device.

If a failure of a storage device is encountered during the writing of data to the array of storage devices for an individual superblock, there are several possible techniques to compensate for the failure: (1) abandon the data that is to be written to the failed storage device for the affected superblock or set of superblocks buffered in the system and do not use any replacement, i.e. reduce the number of data storage devices, and recreate the lost data using parity information; (2) reduce the number of parity storage devices and allocate a parity device for the writing of data and write the data intended for the failed storage device to the storage device that would have stored the parity information; (3) restripe the superblocks affected to use fewer devices; or (4) write the data intended for the failed storage device to a spare storage device. In any of the above three cases, the header information for a superblock accurately identifies where the data and parity information for the superblock can be located in view of the failed storage device.

The first technique set forth above is generally known in the art and is described, for example, in the incorporated U.S. patent application Ser. No. 09/490,258. Thus, this technique will not be further described here in detail. Suffice it to say, the first technique makes use of parity information to recreate the lost data when reading the data from the storage medium.

The second technique is illustrated in FIG. 4A. As shown in FIG. 4A, during the writing of the seventh superblock, the storage device 401 fails. As a result, the number of parity stripes and thus, the number of parity storage devices is reduced from 3 to 2. The data that would have been written to storage device 401 is instead directed to storage device 402 and the rotation of the writing of data and parity information is continued with storage device 402. The storage device 401 is removed from the rotation until an indication is received that the storage device 402 is once again operational.

The writing of the data that would have been written to storage device 401, to the storage device 402, is facilitated by the use of a buffer (not shown). In other words, as the data is being provided to the redundant array of storage devices for writing to the storage medium, the data is initially buffered. The buffer may be either in a controller system of the redundant array of storage devices, such as RAIR controller 150 for example, or in the storage devices themselves. In either case, in the event of a failure to write the data to a storage device, the data is not necessarily lost and may be recovered from the buffer. Thus, if a failure of a storage device is encountered, the data may be retrieved from the buffer and written to another location, such as a storage device designated for parity information, a spare storage device, or the like.

There are several methods for synchronizing the discovery of a failed device with the writing of the data to a reduced set of drives using the second or fourth methods described above:

1) each block written for a superblock is self consistent and contains metadata that describes its relationship to all the other blocks in the superblock. Therefore, when a read is expecting to encounter a P2 block and instead encounters a block that is a data block (in FIG. 4A this would be data block 0), the RAIT system can, by convention or by specifically changing the metadata or by adding change notation to the metadata, assume that there has been an on the fly remapping of the use of the devices. This remapping is reflected in the metadata that is stored in subsequent superblocks;

2) at the point of failure, a new block is appended to the end of each of the data and parity blocks already written in the superblock. This new block is only a metadata block. The inserted metadata block describes the new mapping. An identical metadata block would then be placed both before and after the block that was moved to an alternative drive. When the subsystem reads the blocks from the various media at a later date, it would encounter the inserted metadata description instead of the expected P2 block and from that, discover that there had been a remapping and use the inserted block to understand the new structure and verify consistency. This method is less desirable than the first method from a performance standpoint since it requires additional writing of additional blocks. However it does provide a greater degree of consistency checking. Both methods could be supported in a single product with the choice being directed via installation settings more dynamically done by policy statements communicated independently to the subsystem at volume definition or even at mount time; and 3) another method is to back-up each of the devices, reconstruct the metadata in each block to reflect the new mapping, and write the data and parity information in the new mapping format. This approach is the least desirable since it requires significant delay for the rewrite.

As a result of the failure of storage device 401, the header of the superblock changes to reflect the loss of the storage device 401. The header of the superblock may change, for example, from {1, 8, 3, 101, 0–1 . . . 5–10, 2–4} for the sixth superblock to {1, 8, 2, 102, 0–3 . . . 6 . . . 8–10, 4–5} for the seventh superblock. Thus, the header may change to reflect a change from 3 parity stripes to 2 parity stripes and the removal of the failed storage device 401 from the rotation.

During a read operation for reading the data from the redundant array of storage devices, the header information will inform the control system that it is to expect to receive eight stripes of data and three stripes of parity information and which devices will contain which data/parity information. Thus, the control system can perform a check to determine if the data that is being read is the data that is expected to be read from the storage device.

When storage device 401 is encountered, the control system will not be able to read any data from the storage device 401. The control system will continue to read data and, once data is read from storage device 402, will determine that it expected parity information from storage device 402 but received data instead. However, the header of the superblock for storage device 402 will have been modified to identify the fact that the data in storage device 402 was supposed to be written to storage device 401. Thus, the control system will be informed that the data in storage device 402 is consistent due to the failure of storage device 401 and will be able to interpret the data accordingly.

In this way, the header provides enough information to identify where the data and parity information for the superblock is located. Thus, even with storage device failures, the data and parity information can be stored and retrieved from the storage medium. Since there is no loss of data during such operation, there is no need for the recreation of data using parity information. As a result, the degradation in performance experienced due to recreation of data using parity information is avoided by use of the present invention. Thus, the overall throughput of the RAIR system according to the present invention is improved over known systems.

FIG. 4B illustrates the third method of handling a failed device. In this case the instance of failure is handled exactly as with the second method where the data block replaces the highest order parity block. However, subsequent data is striped with one less data drive and the highest order parity data is reinstated in the mapping. Thus, rather than reducing the number of parity drives due to the failure, the number of parity drives remains at three. Instead, only six data drives are utilized instead of seven. Thus, the data that would have been written to the seventh data drive is effectively lost.

Figure 5:
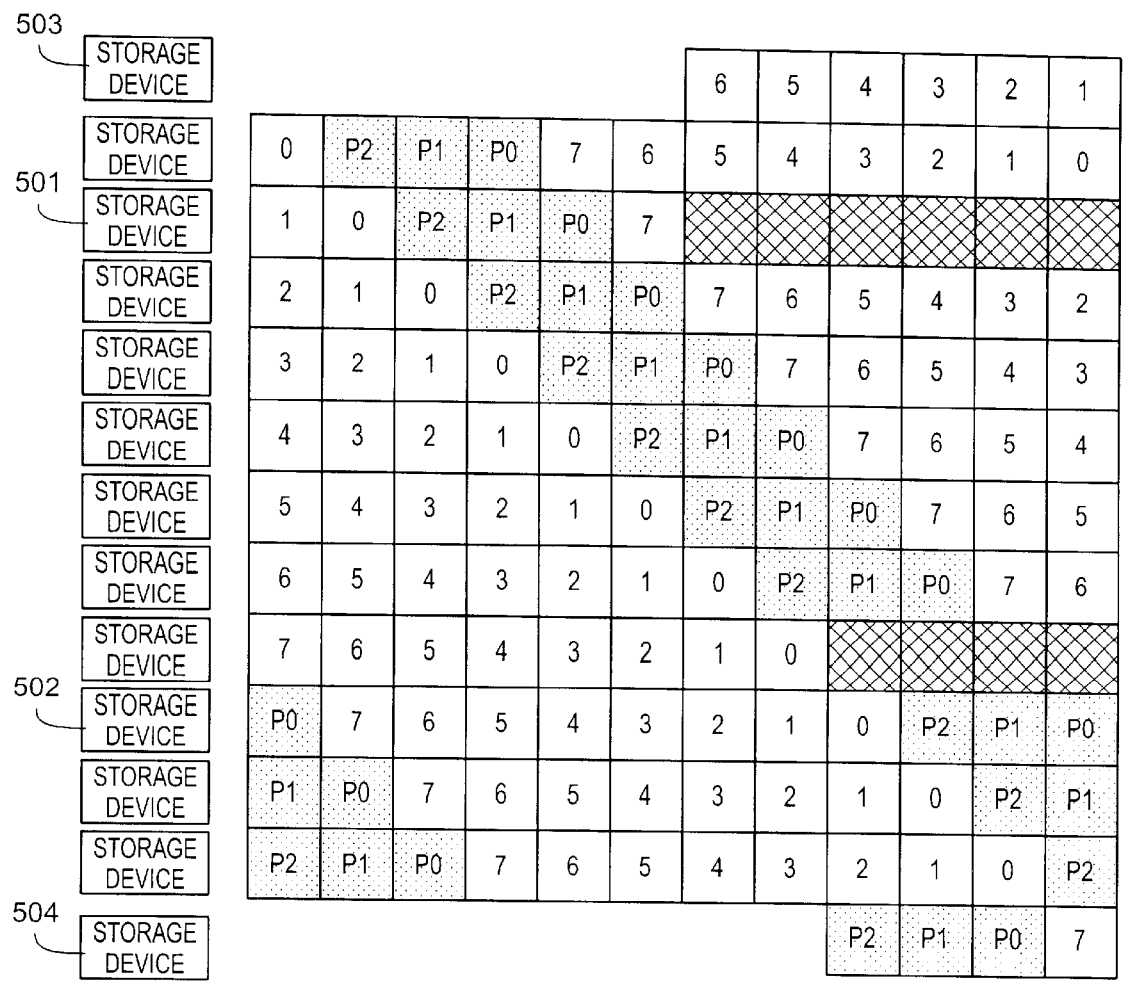
FIG. 5 is an exemplary diagram illustrating an operation of another embodiment of the present invention when a storage device in the array of storage devices fails.

FIG. 5 illustrates the fourth technique for accommodating failed storage devices. As shown in FIG. 5, two storage devices have failed during a write operation. The first failed storage device 501 fails during the writing of a seventh superblock and the second failed storage device 502 fails during the writing of a ninth superblock to the array of storage devices. With this third technique, rather than reducing the number of data stripes or parity stripes, spare drives are mapped into the rotation of the writing to the array of storage devices.

For example, the data that would have been written to the first failed storage device 501 is instead written to storage device 503. Thus, the header of the superblock changes from {1, 8, 3, 101, 0–1 . . . 5–10, 2–4} for the sixth superblock to {1, 8, 3, 102, 0 . . . 2 . . . 6–11, 3–5} for the seventh superblock. Thus, the spare storage device is mapped in as storage device number 11 and the header of the superblock indicates the mapping in of the spare storage device.

When the second failed storage device 502 fails, since the first failed storage device 501 has not been recovered, an additional spare storage device 504 is mapped into the write rotation. Data and parity information that would have been written to the second failed storage device 502 is now written to the spare storage device 504. As a result, the header changes from {1, 8, 3, 102, 0 . . . 2–3 . . . 7–11, 4–6} for the eighth superblock to {1, 8, 3, 104, 0 . . . 2–4 . . . 8–11, 5–6 . . . 12} for the ninth superblock. The second spare storage device 504 is mapped in as storage device 12 and the header is changed to reflect the parity information that would have been stored on failed storage device 502 being written to spare storage device 504.

Thus, with the present invention, the mapping-in of spare storage devices may be utilized to compensate for failed storage devices in the array of storage devices. The header for the superblock is changed to reflect the mapping in of the spare storage devices. In this way, data and parity information is not lost when one or more storage devices fail during a write or read operation. Similar to the second technique, this allows for increased throughput when compared to known RAIR systems.

In addition to the above, a combination of the second and fourth techniques or third and fourth techniques may also be utilized without departing from the spirit and scope of the present invention. For example, spare storage devices may be mapped into the write rotation until there are more failed storage devices than there are spare storage devices. When this occurs, the second technique may be utilized to accommodate the additional failed storage devices. Thus, spare storage devices may be mapped into the write rotation and then parity information may be reduced should additional storage devices fail. Alternatively, the number of data storage devices may be reduced should additional storage devices fail.

Figure 6:
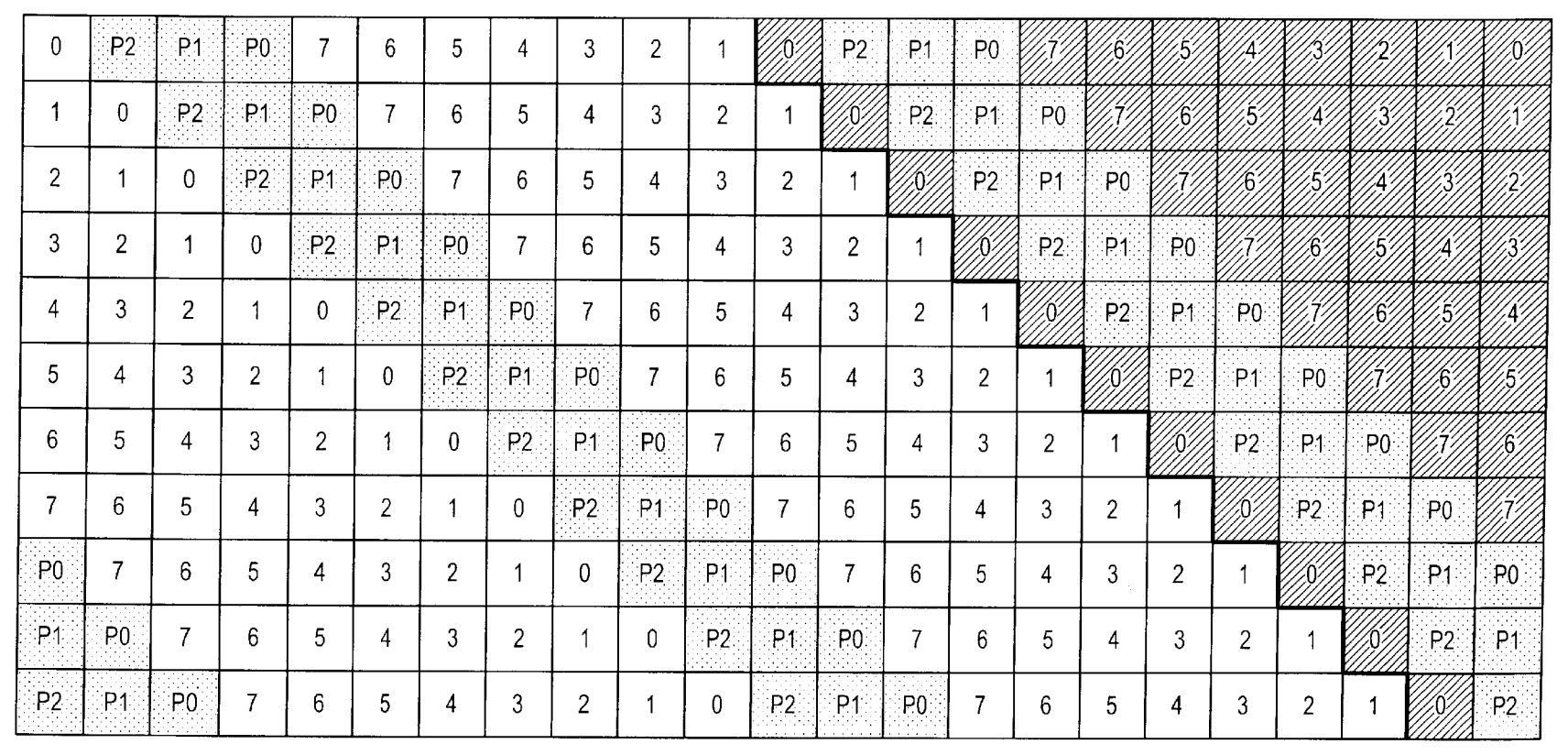

As mentioned above, the header information discussed so far represents a minimum set of header information for use with the present invention. Additional information may be included in the header information to make the header much more versatile. FIG. 6 provides an example table of additional information that may be included with the header information discussed above.

As shown in FIG. 6, the additional header information may include such information as status information, superblock size per stripe, superblock size, number of valid bytes in the superblock, date, header size, and the like. The information in the baseline, unit, min., max, header bytes, and scalability columns provide additional details regarding the values, and limits thereon, for this additional information.

Figure 7:
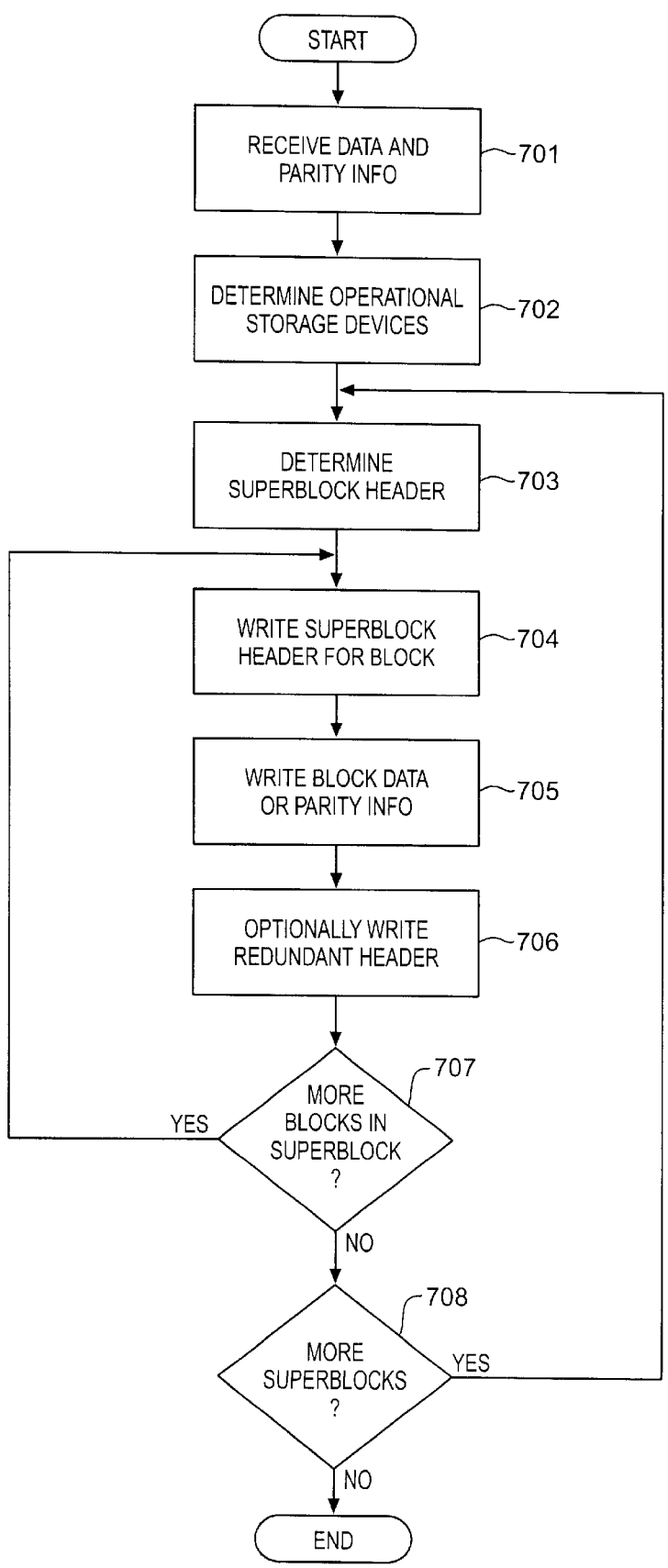
FIG. 7 is a flowchart outlining an exemplary operation according to one embodiment of the present invention.

FIG. 7 is a flowchart outlining an exemplary operation of the present invention when writing data and parity information to a storage medium. As shown in FIG. 7, the operating starts with receiving data and parity information that is to be written to the virtual volume, i.e. the array of storage devices (step 701). Then, it is determined which storage devices in the array of storage devices are operational (step 702). Based on the operational storage devices, the superblock header is determined (step 703) and is written to a storage device in the array of storage devices that is to store the first data block in the superblock (step 704).

Thereafter, the data block or parity information is written to the storage device (step 705). Optionally, the superblock header may be repeated as a redundant header at the end of the data block or parity information (step 706). It is then determined whether there are more blocks in the superblock that is being written (step 707). If there are more blocks to be written, the operating returns to step 704. If there are no more blocks, it is then determined whether there are more superblocks to be written to the virtual volume (step 708). If there are more superblocks, the operation returns to step 703. Otherwise, the operation ends.

In an alternative embodiment, the detection of a failed storage device may be performed at the time that a write operation is attempted to the storage device. If the write operation encounters a failed storage device, the data block or parity information may then be written to either the next available storage device with the number of parity stripes reduced, or may be written to a spare storage device in a manner set forth above.

In either case, the superblock header for the block may be modified to reflect the failure of the storage device. Thus, the superblock headers for blocks written prior to the failure will be different from the superblock headers of the blocks written after the failure. By looking at the superblock headers for each block of a superblock, an error can be identified and a failed storage device may be identified based on a change in the superblock header within the superblock.

Figure 8:
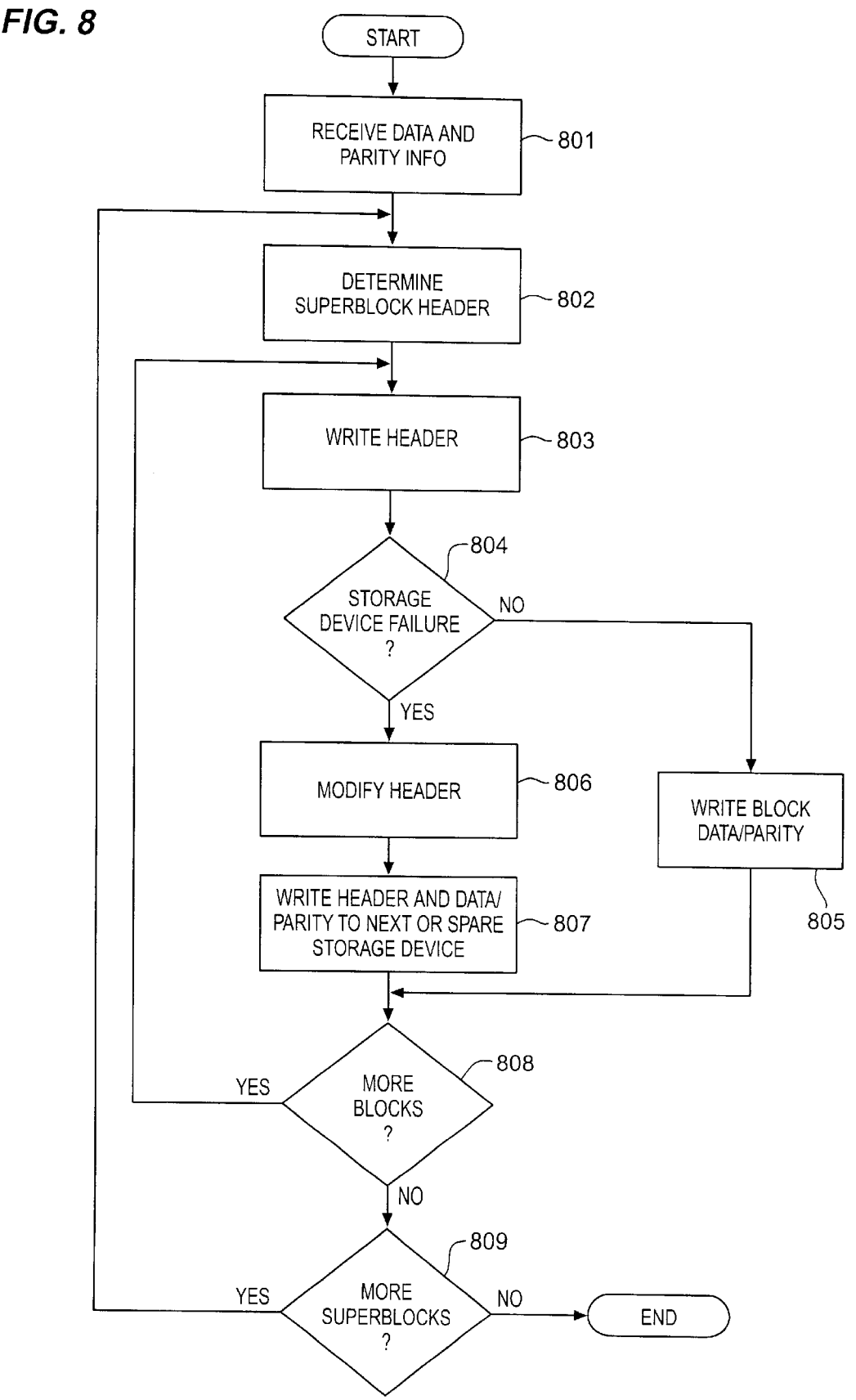
FIG. 8 is a flowchart outlining an exemplary operation according to another embodiment of the present invention.

FIG. 8 is a flowchart outlining an exemplary operation of the present invention according to the above alternative embodiment. As shown in FIG. 8, the operation starts with receiving data and parity information that is to be written to the virtual volume (step 801). The superblock header is then determined (step 802) and a write attempt is made to the storage device (step 803).

A determination is then made as to whether there was a failure of the storage device during the write attempt (step 804). If not, the block data or parity information is then written to the storage device (step 805). If there was a failure, the superblock header is modified in view of the storage device failure (step 806) and the modified header and data or parity information is written to either the next available or spare storage device (step 807).

A determination is then made as to whether or not there are more blocks in the superblock that is being written (step 808). If so, the operation returns to step 803. If not, a determination is made as to whether or not there are more superblocks (step 809). If there are more superblocks, the operation returns to step 802. If there are no more superblocks, the operation ends.

In particular, the mechanism of the present invention provides a set of removable media maintained by a storage subsystem as a single logical entity for other systems accessing this subsystem. In the depicted example, tape is the depicted media, but any removable media or functionally removable devices containing media such as small disk drives may be used with the mechanism of the present invention. The set of removable media in these examples consists of n units for addressing performance requirements of data where n is greater than 0. The set also employs p units for addressing reliability requirements, where p is greater than or equal to 0. In these examples, customer data may be reformatted into collections of data also referred to as super blocks. A system of metadata is resident on each of the individual pieces or units of media. This metadata identifies the units that are members of a set and the relationship of each unit of data stored thereon (e.g., in a super block) to all other sub-sets of customer data in the set. Reassignment of functions of each of the units of media may be achieved during the course of writing data to the media. This mechanism allows up to p units of media to be individually dropped from usage and individually returned to service in any order during the course of writing data to the media.

The mechanism of the present invention also includes further beneficial features of providing an arbitrarily large capacity removable media. In particular, the mechanism of the present invention allows more than one set of removable media to be used to store data. This number of sets may be arbitrarily large. For example, two or more sets of tape drives or tapes may be used to store data. Of course, other types of removable media may be used and the types of removable media may be mixed, such as, for example, tapes and disks, depending on the particular implementation. Further, the technology used for each set may be different.

The mechanism of the present invention provides a transition from one set of removable media to another set of removable media. This transition may be gradual in which as little as one extra removable media drive is transitioned at a time. Alternatively, a setup of all of the media in the new set may be set up at one time. The value of n and p may be different for each set and changed during usage of the set of removable media. Additionally, in these examples, the system of metadata stored on an arbitrary media set k also identifies units of media in set k−1 and k+1. Set k−1 is the set of media prior to k while k+1 is the set of media after k. The terms 'prior' and 'after' can be determined by assessing the logical sequences of the data or by the temporal sequences of the data or by other algorithmic means. The system of metadata stored on the units of media in a particular set of media will also identify the following:

(1) The number of sets that may be included in the definition of the single logical entity addressed by the system accessing the sets of data or the boundaries established for such a number;

(2) The number of sets currently in use in the single logical entity addressed by the system accessing the media and the placement within the boundaries;

(3) The specific units of media in each set in the definition, including individual values of n, p, and other specific information to the set, such as unusable sections of media;

(4) The position of specific data in the sets. The number of sets currently in use may be, for example, a setup to use only the first two sets out of k possible sets, a setup to use the first and nth set of k possible sets, or a setup to use the nth through the ith of k possible sets of removable media. Unused sets do not require allocation of media units except as an installation preference in these examples. The mechanism of the present invention also allows an ability to move one item of data located in a specific set of removable media to another item of customer data located in a different set of removable media.

Figure 9:
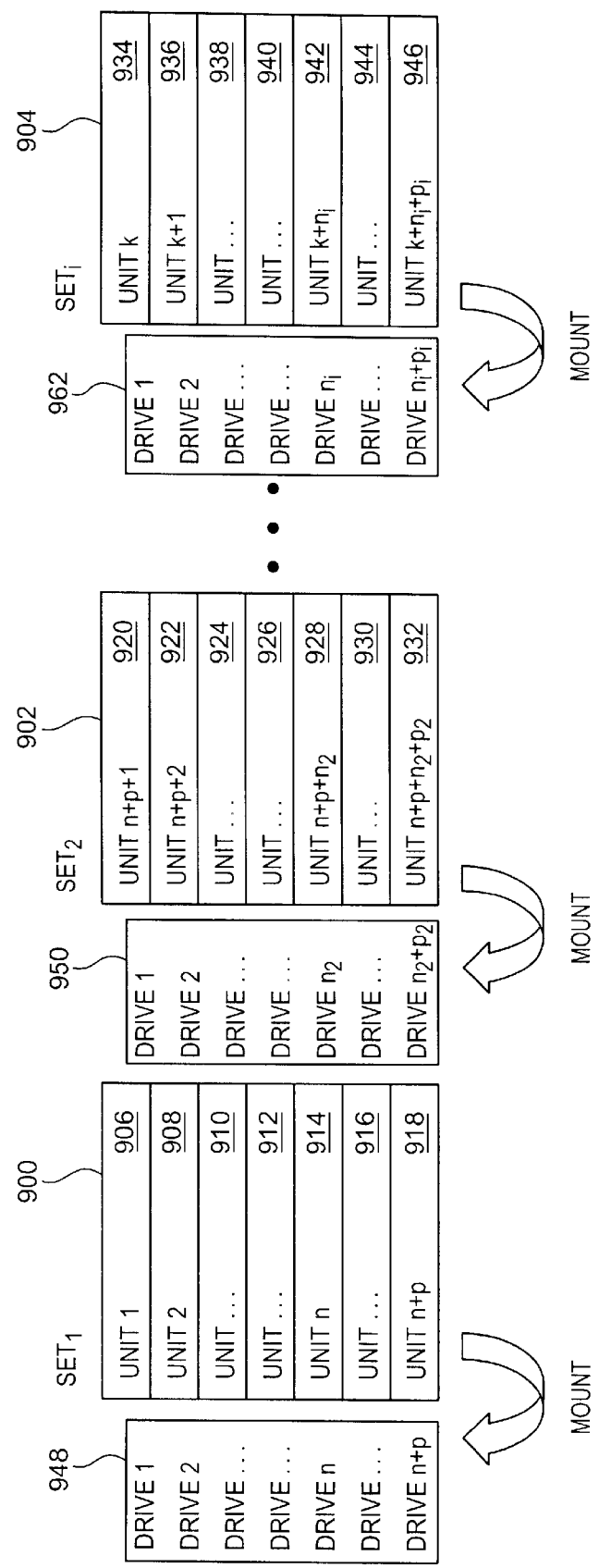
FIG. 9 is a diagram illustrating different sets of removable media in accordance with a preferred embodiment of the present invention.

With reference now to FIG. 9, a diagram illustrating different sets of removable media is depicted in accordance with the preferred embodiments of the present invention. In FIG. 9, set 900, set 902, and set 904 are illustrations of different sets of removable media. Each set includes a number of units of removable media. For example, set 900 includes units 906–918. These units in these examples may be a set of tape cartridges or cassettes, hard disk drives, or optical disks.

Alternatively, the units could be mixed media and units between different sets may be mixed. Set 902 includes units 920–932 while set 904 includes units 934–946. The media unit 906 is the first media unit of set 1, while the unit 920 is the equivalent first piece of media in set 2. Unit 902 would then be the $n+p+1^{th}$ media unit used in the system. Since n and p can vary for each set, the first piece of media in the third set would be the $n+p+n_2+p_2$ piece of media used for this specific virtual volume. In these examples, a media unit is a single unit of removable media, such as a tape cartridge or cassette, a removable hard disk drive, or an instance of magnetic or optical disk media. A drive is a device capable of loading, reading, and writing to the media contained in the media unit. In this example, a first set of media units, set 900 is mounted on a set of drives with data being accepted until this set of media is filled. While set 900 is removed from the drives and a second set is mounted on the second set of drives, data is buffered or temporarily stored and then operations are slowed down until the mounting of the new set of media, set 902 in this example, is complete. When the mounting of the new set of media is complete, then access to the media proceeds at a normal speed.

Set 900 may be mounted within drive set 948, which contains a number of drives designed to receive the units within set 900. Similarly, set 902 may be mounted for use in drive set 950 and set 904 may be mounted within drive set 962 in these examples.

Figure 10:
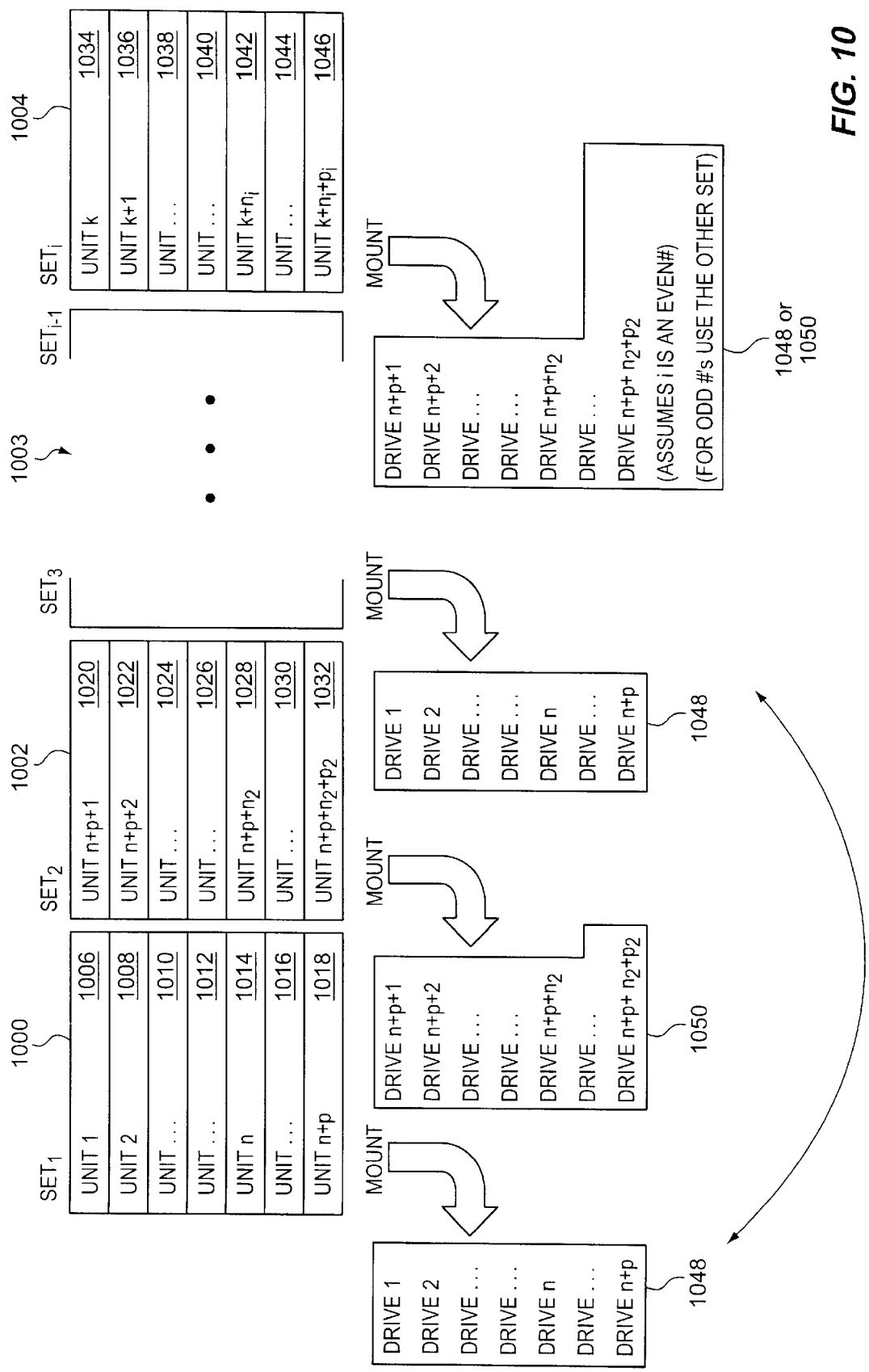
FIG. 10 is a diagram illustrating units of storage media and drives in accordance with a preferred embodiment of the present invention.

Turning next to FIG. 10, a diagram illustrating units of storage media and drives are depicted in accordance with the preferred embodiments of the present invention. In this example, sets 1000, 1002, and 1004 are sets of removable media. Set 1000 includes units 1006–1018, set 1002 includes units 1020–1032, and set 1004 includes units 1034–1046. These sets of removable media may be mounted or placed into drives located within drive sets 1048, 1050, and 1052. In this example, set 1000 is mounted or placed into drive set 1048, set 1002 is mounted in drive set 1050, and set 1004 is mounted in drive set 1052. In this particular example, set 1000 is mounted in drive set 1048 and data is accepted until all of the units in set 1000 are filled. While the first set of media units in set 1000 are being filled, a second set of media in set 1002 is mounted on drive set 1050. While set 1002 is filled, the first set of media in set 1000 is removed from drive set 1048 and set 1003 is mounted in drive unit 1048. This process of alternating the use of two sets of drives continues through the mounting of each of the sets of media that have the same drive type (e.g., set 4 on drive set 1050, set 5 on drive set 1048, etc. When new drive types are required, then another pair of drive sets must be allocated. If the de-mount/mount process takes longer than the time to fill a set of media, then data may be buffered and access to the media may be slowed until the mounts are complete. When the mounting of units within a drive unit is complete, then normal access is provided. If the de-mount/mount process is fast enough, then access to the media never slows down. In this example, a double set of drives is typically required, such as, for example, $2 \times (n_{max}+p_{max})$.

Figure 11:
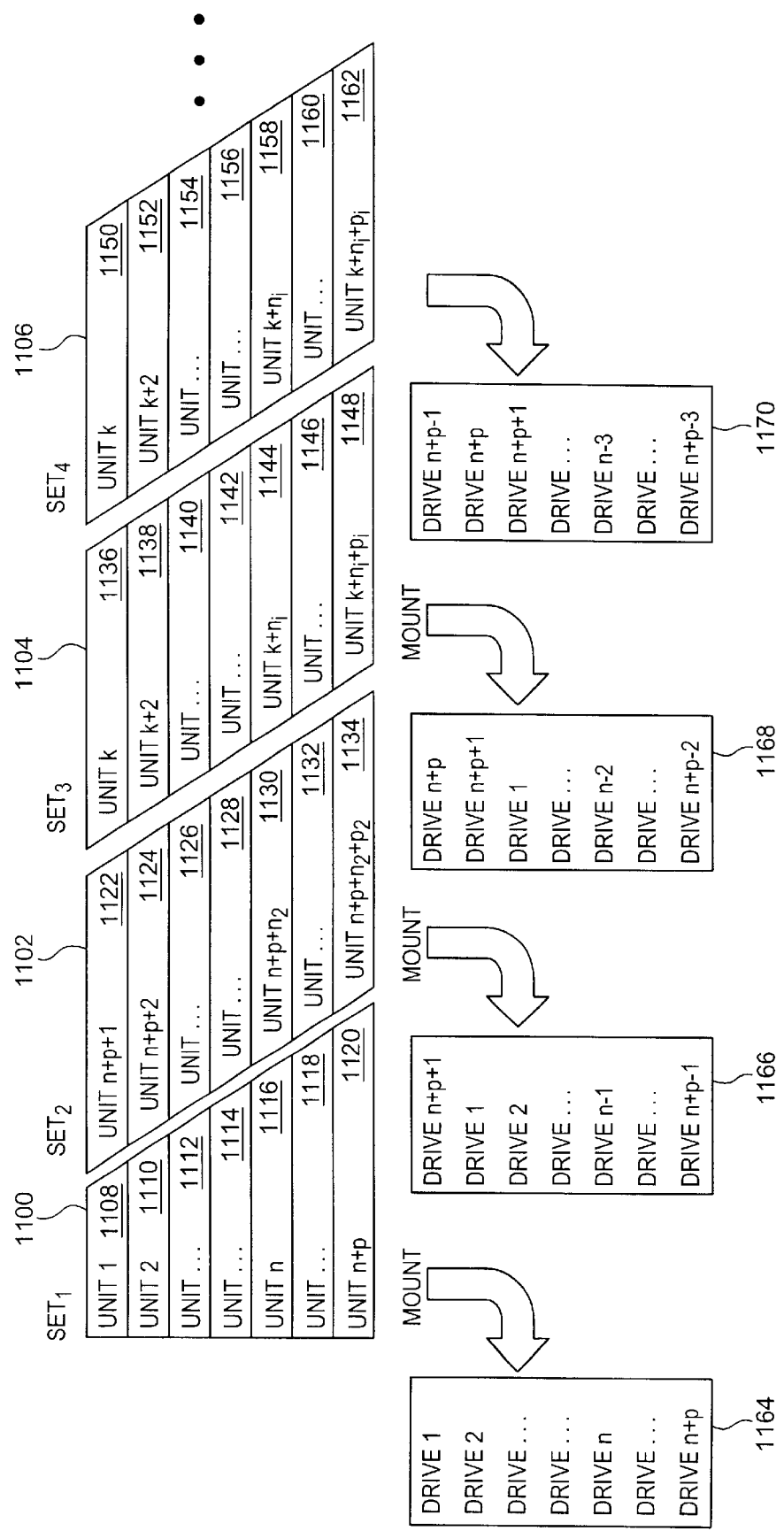
FIG. 11 is a diagram illustrating sets of media units and drive units in accordance with a preferred embodiment of the present invention.

Turning next to FIG. 11, a diagram illustrating sets of media units and drive units are depicted in accordance with the preferred embodiments of the present invention. In this example, media sets 1100, 1102, 1104, and 1106 are present. Set 1100 includes units 1108–1120, set 1102 includes units 1122–1134, set 1109 includes units 1136–1148, and set 1106 includes units 1150–1162. These sets of units may be mounted on drives organized as shown in drive sets 1164–1170. Media set 1100 is mounted on drive set 1164 which consists of drive 1 through drive n+p, media set 1102 is mounted on drive set 1166 which consists of drive 1 through drive n+p−1 plus drive n+p+1. The drives in set 1164 are transferred to set 1166 one at a time. Media set 1104 is mounted on drive set 1168, and media set 1106 is mounted on drive set 1170 in these examples. When media set 1100 is mounted on drive set 1164, also, the first media unit of media set 2 (1102), unit 1122, is mounted on drive n+p+1 which is the first drive to be used within drive set 1166. Data is accepted until media unit 1108 is filled to a first media unit staging point. The first media unit staging point is that point at which writing to the first unit of media in media set 1 must be discontinued and writing must be transferred to media unit 1 of media set 2 (media unit 1122) in order that each of the units of media in set 2 can be substituted for the media units in set 1 (one at a time) and all of this can be accomplished before the last media unit in set 1 (media unit 1120) has been filled.

When the first unit of media in use gets to the first media staging point, the use of the first unit of media, unit 1108, within set 1100 is discontinued and the first unit of media, unit 1122, in set 1102 is used. There are now two concurrent sets of media in use and the metadata for all blocks must identify the specific units of media mapped for use, both within the first set of media units, set 1100, and within the second set 1102. The first unit of media, unit 1108, in set 1100 is unloaded from drive 1 within drive set 1164. The second unit of media in set 1102 is loaded onto drive 1 which is now in drive set 1166. Immediately, the use of the second unit of media, unit 1110, in set 1100 is discontinued. The second unit of media, unit 1124 in set 1102 is used. The metadata for all blocks now identify this unit of media as also being mapped for use with the first unit of media in set 2 (media unit 1122) and the rest of the set of media units in set 1100.

This process continues until the entire first set of media units in set 1100 has been replaced one by one in a scheduled order by media units in set 1102. At that time, the drive n+p is now not used and becomes the spare drive. The first unit of media in set 3 is immediately mounted in the spare drive and data is accepted until the second set of media units is filled to first media unit staging point for that set. At that point, the process of staging to the units within the next set (1104) is repeated unit by unit. In this example, the system uses only one extra drive, such as drive n+p+1 in drive set 1166. Drive number n+p+1 which originally was the spare drive was used as the first drive of drive set 1166 with the first media unit (1122) n+p+1 of media set 2 (1102) on drive n+p+1 waiting for media set 2 (1102) to be invoked. As the process proceeds, the last drive of each drive set "k" becomes the spare drive and is used as the first drive of a subsequent drive set "k+2".

Figure 12:
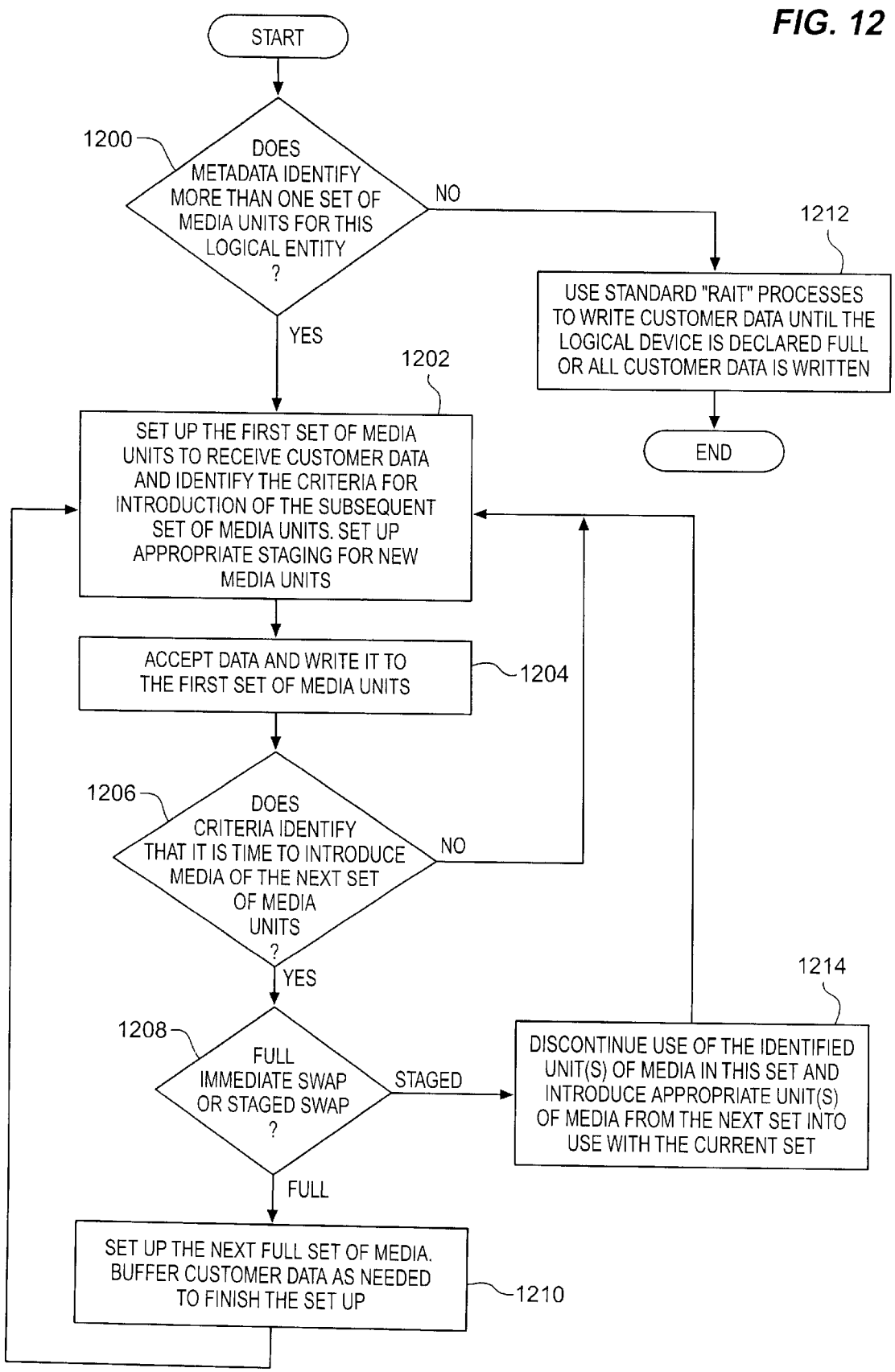
FIG. 12 is a flowchart of a process for processing data in an arbitrarily large capacity removable media system in accordance with a preferred embodiment of the present invention.

Turning now to FIG. 12, a flowchart of a process for processing data in an arbitrarily large capacity removable media system is depicted in accordance with the preferred embodiments of the present invention. This process may be implemented in a data processing system, such as server 104 in FIG. 1 to manage data in a number of sets of removable media. This removable media may be located at storage unit 106 or to another storage subsystem connected to server 104 depending on the particular implementation.

The process begins by determining whether metadata identifies the ability to use more than one set of media units for a logical entity. If the metadata does identify more than one set of media units can be used for the logical entity, then a set of media units are set up to receive customer data and identify the criteria for introduction of a subsequent set of media units (step 1202). This setup is made as appropriate for staging the introduction of new media units. Data is accepted and written to the first set of media units (step 1204). A determination is then made as to whether the criteria identified that it is time to introduce media from the next set of media units (step 1206). If it is not time to introduce media from the next set of media units, the process returns to step 1204. Otherwise, a determination is made as to whether the introduction of media from the next set of media units is an immediate swap or a staged swap of media units (step 1208). If the introduction is to be a full immediate swap, then the next full set of media is brought up and customer data is buffered as needed to finish the setup of the next full set of media (step 1210) with the process then returning to step 1204. If the introduction of media from the next set of media units is a staged swap, then the use of one or more units is discontinued in the present set of media and one or more appropriate units from the next set of media is introduced for use with the current set (step 1214) with the process then returning to step 1204 as described above.

With reference again to step 1200, if the metadata does not identify more than one set of media units for the logical entity, then a standard RAIT process is used to write customer data until the logical device is declared full or all customer data is written (step 1212) with the process terminating thereafter.

Turning next to FIG. 13, a diagram of types of metadata required for this system to be fully functional is depicted in accordance with a preferred embodiment of the present invention. The metadata is associated with the system in several different ways. One set of metadata is generally included with each super block of data written on any piece of media and identifies the relationship of the specific super blocks written as a contemporary set including media unit locations and functional use such as application data of redundancy data. This metadata can also be inferred with a flag that indicates that the metadata has not changed and can be algorithmically derived from the previous set of metadata. This will reduce the amount of overhead for metadata storage significantly. When there is a change in the algorithmic metamorphosing of the metadata (e.g., a device has stopped working and must be mapped out of the rotation), the flag indicates the presence of the changed metadata. Another set of metadata is generally only required in few strategic locations on each unit of media. The location of this metadata is dependent on the architecture of the media unit. A longitudinal tape, which writes to the end and then will rewind might record this metadata at the load point and again at end of tape. A serpentine tape which writes down and then back so the end and the beginning are at the same point on the tape might only record the metadata once. Using systems will find greater utility if the subsystem records this metadata at other strategic locations like when file markers are written to tape. This metadata includes the items noted as once per piece of media in FIG. 13.

Thus, the present invention provides a system, apparatus and method in which header information is used to provide an accurate indication of the location of data and parity information in a virtual volume. The header information allows data and parity information to be written to other storage devices, such as a spare storage device, in the event of a failure. In this way, the overall throughput is increased since reconstruction of lost data is avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data storage system for managing storage of data, the method comprising:

mounting a first set of removable media on a first set of storage devices;

writing data to said first set of removable media;

mounting a second set of removable media on a second set of storage devices during said step of writing data to said first set of removable media;

determining whether criteria is present; and responsive to a determination that the criteria is present, ceasing said writing data to said first set of removable media, beginning writing data to said second set of removable media; and unmounting said first set of removable media while said data is being written to said second set of removable media.

2. The method of claim 1, further comprising:

buffering data until the second set of removable media is setup to store the data.

3. The method of claim 2, further comprising:

slowing a speed at which data is accepted at said first set of storage devices until the second set of removable media data is available to accept the data.

4. The method of claim 1, wherein the first set of removable media is a plurality of tapes.

5. The method of claim 1, wherein the first set of removable media is a set of hard disc drives.

6. The method of claim 5, wherein the second set of removable media is a set of tapes.

7. A method in a data storage system for managing storage of data, the method comprising:

allocating a pair of sets of storage devices;

writing data to a first set of removable media which had been mounted on a first one of said pair of sets of storage devices;

mounting a second set of removable media on a second one of said pair of sets of storage devices, while the data is being written to the first set of removable media;

identifying criteria for swapping from said first set of removable media to said second set of removable media;

during said writing of data to said first set of removable media, determining whether said criteria is present;

responsive to a determination that the criteria is present, swapping from said first set of removable media to said second set of removable media;

in response to said swapping, ceasing said writing to said first set of removable media and beginning writing to said second set of removable media; and during said writing to said second set of removable media, unmounting said first set of removable media.

8. The method of claim 7, further comprising:

mounting a third set of removable media on said first one of said pair of storage devices, while the data is being written to the second set of removable media.

9. A method in a data storage system for managing storage of data, the method comprising:

mounting a first set of removable media in a set of drives;

mounting a first unit of removable media of a second set of removable media in an additional drive;

writing data to the first unit of removable media of the first set of removable media;

determining whether criteria is present that indicates it is time to execute a staged media swap;

responsive to a determination that the criteria is present, discontinuing writing of data to the first unit of media in the first set of removable media, writing data to the first unit of media in the second set of removable media, and unmounting the first unit of media in the first set of removable media from said first drive while said data is being written to the first unit of removable media in the second set of removable media.

10. The method of claim 9, further comprising:

while said data is being written to the first unit of media in the second set of removable media, mounting a second unit of media from the first set of removable media in the first drive;

responsive to a determination that the criteria is again present, discontinuing writing of data to the first unit of media from the second set of removable media, beginning writing data to the second unit of media of the first set of removable media in the first drive, unmounting the first unit of media of the second set of removable media from the additional drive, and while data is being written to the second unit of media of the first set of removable media, mounting a second unit of media of the second set of removable media in the additional drive.

11. A data processing system for managing storage of data, the data processing system comprising:

mounting means for mounting a first set of removable media on a first set of storage devices;

writing means for writing data to said first set of removable media;

mounting means for mounting a second set of removable media on a second set of storage devices during said writing of data to said first set of removable media;

determining means for determining whether criteria present; and responsive to a determination that the criteria is present, ceasing means for ceasing said writing data to said first set of removable media, writing means for beginning writing data to said second set of removable media; and unmounting means for umnounting said first set of removable media while said data is being written to said second set of removable media.

12. The data processing system of claim 11, further comprising:

buffering means for buffering data until the second set of removable media is setup to store the data.

13. The data processing system of claim 12, further comprising:

slowing means for slowing a speed at which data is accepted said first set of storage devices until the second set of removable media data is available to accept the data.

14. The data processing system of claim 11, wherein the first set of removable media is a plurality of tapes.

15. The data processing system of claim 11, wherein the first set of removable media is a set of hard disc drives.

16. The data processing system of claim 15, wherein the second set of removable media is a set of tapes.

17. A data processing system for managing storage of data, the data processing system comprising:

allocating means for allocating a pair of sets of storage devices;

writing means for writing data to a first set of removable media which had been mounted on a first one of said pair of sets of storage devices;

mounting means for mounting a second set of removable media on a second one of said pair of sets of storage devices, while the data is being written to the first set of removable media;

identifying criteria for swapping from said first set of removable media to said second set of removable media;

during said writing of data to said first set of removable media, determining means for determining whether said criteria is present;

responsive to a determination that the criteria is present, swapping means for swapping from said first set of removable media to said second set of removable media; in response to said swapping, ceasing means for ceasing said writing to said first set of removable media, writing means for beginning writing to said second set of removable media, and unmounting means for unmounting said first set of removable media during said writing to said second set of removable media.

18. The data processing system of claim 17, further comprising:

mounting means for mounting a third set of removable media on said first one of said pair of storage devices, while the data is being written to the second set of removable media.

19. A data processing system for managing storage of data, the data processing system comprising:

mounting means for mounting a first set of removable media in a set of drives;

mounting means for mounting a first unit of removable media of a second set of removable media in an additional drive;

writing means for writing data to the first unit of removable media of the first set of removable media;

determining means for determining whether criteria is present that indicates it is time to execute a staged media swap;

responsive to a determination that the criteria is present, discontinuing means for discontinuing writing of data to the first unit of media in the first set of removable media, writing means for writing data to the first unit of media in the second set of removable media, and unmounting means for unmounting the first unit of media in the first set of removable media from said first drive while said data is being written to the first unit of removable media in the second set of removable media.

20. The data processing system of claim 19, further comprising:

while said data is being written to the first unit of media in the second set of removable media, mounting means for mounting the first unit of media from a second set of removable media in the first drive;

responsive to a determination that the criteria is again present, discontinuing means for discontinuing writing of data to the first unit of media from the second set of removable media, writing means for beginning writing data to the second unit of media of the first set of removable media in the first drive, unmounting means for unmounting the first unit of media of the second set of removable from the additional drive, and while data is being written to the second unit of media of the first set of removable media, mounting means for mounting a second unit of media of the second set of removable media in the additional drive.

21. A computer program product in a computer readable medium for managing storage of data, the computer program product comprising:

instructions for mounting a first set of removable media on a first set of storage devices;

instructions for writing data to said first set of removable media;

instructions for mounting a second set of removable media on a second set of storage devices during said writing data to said first set of removable media;

instructions for determining whether criteria is present; and responsive to a determination that the criteria is present, instructions for ceasing said writing data to said first set of removable media, instructions for beginning writing data to said second set of removable media; and instructions for unmounting said first set of removable media while said data is being written to said second set of removable media.

22. A computer program product in a computer readable medium for managing storage of data, the computer program product comprising:

instructions for allocating a pair of sets of storage devices;

instructions for writing data to a first set of removable media which had been mounted on a first one of said pair of sets of storage devices;

instructions for mounting a second set of removable media on a second one of said pair of sets of storage devices, while the data is being written to the first set of removable media;

instructions for identifying criteria for swapping from said first set of removable media to said second set of removable media;

during said writing of data to said first set of removable media, instructions for determining whether said criteria is present;

responsive to a determination that the criteria is present, instructions for swapping from said first set of removable media to said second set of removable media; in response to said swapping, instructions for ceasing said writing to said first set of removable media, instructions for writing to said second set of removable media, and during said writing to said second set of removable media, instructions for unmounting said first set of removable media.

23. A computer program product in a computer readable medium for managing storage of data, the method comprising:

instructions for mounting a first set of removable media in a set of drives;

instructions for mounting a first unit of removable media of a second set of removable media in an additional drive;

instructions for writing data to the first unit of removable media of the first set of removable media;

instructions for determining whether criteria is present that indicates it is time to execute a staged media swap;

instructions, responsive to a determination that the criteria is present, for discontinuing writing of data to the first unit of media in the first set of removable media, for writing data to the first unit of media in the second set of removable media, for unmounting the first unit of media in the first set of removable media from said first drive while said data is being written to the first unit of media in the second set of removable media.

* * * * *